July 7, 1970  W. G. DUDLEY ET AL  3,519,934
TEMPERATURE STRAIN RELIEF MOUNTING FOR D-C METER ARMATURE COIL
Filed June 9, 1967
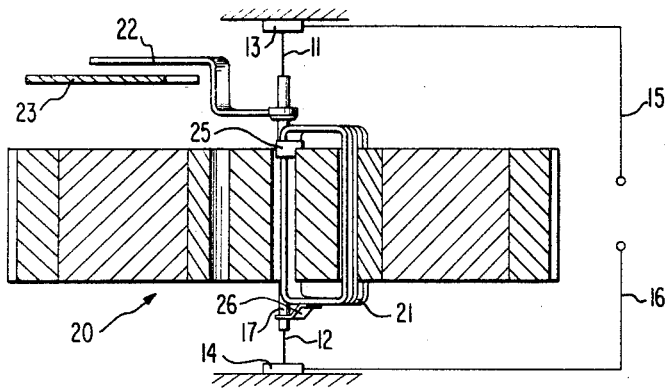
FIG.1
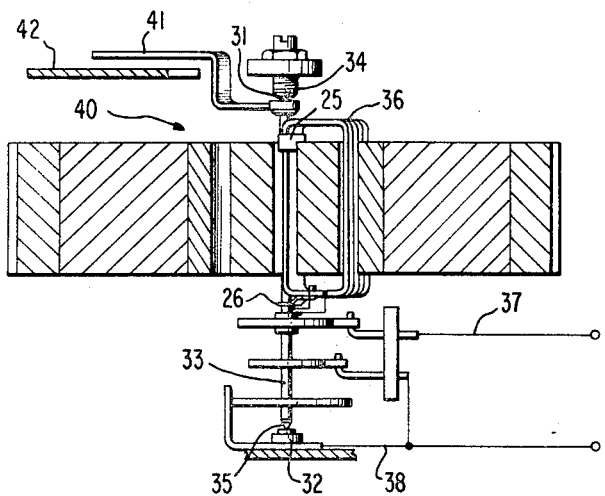
FIG.2
FIG.4
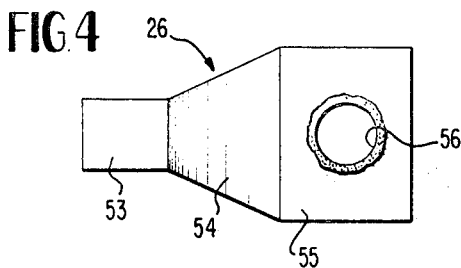
FIG.3
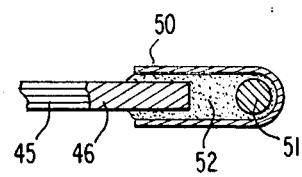
FIG.5
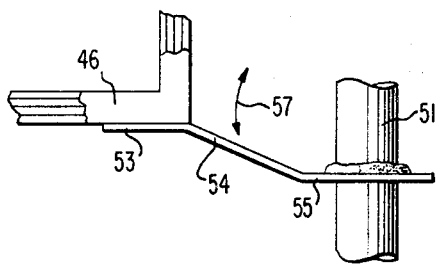
INVENTORS
WILLIAM G. DUDLEY
HAROLD RICH
BY *Richard E. Hesley*
ATTORNEY United States Patent Office 3,519,934
Patented July 7, 1970

3,519,934
TEMPERATURE STRAIN RELIEF MOUNTING
FOR D-C METER ARMATURE COIL
William G. Dudley, Lynnfield, and Harold Rich, Lynn, Mass., assignors to General Electric Company, a corporation of New York
Filed June 9, 1967, Ser. No. 645,016
Int. Cl. G01r 1/02
U.S. Cl. 324—154                    4 Claims

ABSTRACT OF THE DISCLOSURE

An armature coil is directly connected to the rotatable shaft of a moving coil instrument by a rigid and a flexible bracket. Changes in the relative dimensions of the coil and the shaft due to dissimilar thermal coefficients of expansion are absorbed by the flexible mounting, eliminating shaft warpage and misalignment.

BACKGROUND OF THE INVENTION

This invention is directed to electric indicating meters and more particularly to moving coil instruments.

In prior art jeweled pivot and taut band moving coil instruments, the moving coil and its shell are usually bonded directly to a supporting shaft. However, the normally encountered copper wire and aluminum shaft may, when subjected to thermal changes, produce a bimetal effect. Strains are thereby produced which can cause permanent changes in balance and zero settings. When such a moving coil assembly is associated with a long scale electrical instrument in which the coil is eccentrically mounted, these and other strains can produce appreciable errors. Mounting the coil at a single point on the shaft may avoid the problem when a short coil is utilized, but when, as in the illustration, the axial dimension of the coil exceeds its transverse dimension, an additional supporting point must be provided.

Therefore, it is an object of this invention to provide a meter which is less susceptible to errors caused by strains in the meter.

It is another object of this invention to provide a long scale meter having a moving coil wherein strains caused by temperature changes are substantially reduced.

SUMMARY

In accordance with this invention, the moving coil and its shell are affixed to the rotatable shaft by fixed and flexible supports to provide dimensioanl changes between the coil and shaft withotu introducing strain into the shaft.

BRIEF DESCRIPTION OF THE DRAWINGS

The invention has been pointed out with particularity in the appended claims. For a more thorough understanding of the above and further advantages and objects of this invention, reference should be made to the following description taken in conjunction with the following drawings wherein:

FIG. 1 illustrates the application of this invention to a taut band electrical instrument;

FIG. 2 illustrates the application of this invention to a jewel and pivot electrical instrument;

FIG. 3 illustrates details of the fixed bracket assembly; and

FIGS. 4 and 5 illustrate details of the flexible bracket assembly.

DESCRIPTION OF THE PREFERRED EMBODIMENT

Referring to FIG. 1, a taut band moving coil instrument includes two portions of a taut band 11 and 12 which are individually connected to supports 13 and 14, these supports additionally serving as terminals for conductors 15 and 16. The central portion of the moving coil assembly is formed by a solid shaft 17 which rotates under the influence of a permanent magnet field produced by a magnet assembly 20 and a field produced by electrical current flowing through a coil 21. As known in the art, interaction of the magnetic fields causes deflection of the shaft 17 and the coil 21 about an axis through the taut band which is visible as a deflection of a pointer 22 along a scale 23. A fixed support bracket 25 and a flexible support bracket 26 described hereinafter are shown as connecting the coil 21 to the shaft 17.

A pivot and jewel movement shown in FIG. 2 and described and claimed in Pat. 2,982,915, Rich et al., issued May 2, 1961 and assigned to the same assignee as the present invention, comprises two jewel assemblies 31 and 32 which support a shaft 33 having pivot portions 34 and 35 at the ends thereof. A coil 36 is energized by means of conductors 37 and 38 coupled to the coil by a spring assembly as known in the art. Energization of the coil 36 produces a magnetic field which then interacts with the magnetic field produced by a magnet assembly 40 to cause deflection of a needle 41 along a scale 42. Again, a fixed support 25 and a flexible support 26 provide a means of connecting the coil 36 to the shaft 33.

As pointed out above, in the prior art when the coil was affixed to the shaft in a long scale instrument, distortion occurred which caused imbalance and zero errors. This problem is particularly acute in long scale instruments because the coil assembly is generally mounted eccentrically to the shaft as opposed to shorter scale instruments wherein the coil is mounted symmetrically with the shaft.

An example of a fixed support bracket is shown in FIG. 3 wherein a coil 45 is shown as being wound on a frame 46 in a manner well known in the art. A U-shaped metallic strap member 50 is then wrapped around the shaft, designated 51, and bonded to the shell 46 and coil 45 by bonding means 62. This provides a fixed upper terminus for the coil 45 and shell 46.

FIGS. 4 and 5 reveal the construction of a flexible support bracket formed in accordance with this invention. Flexible support bracket 26 includes a first section 53, a second section 54, and a third section 55. The first and third sections 53 and 55 normally lie in substantially parallel offset planes and are interconnected by the second portion 54. An aperture 56 in the third portion 55 serves to allow the shaft 51 to be bonded to the third portion 55. The first portion 53 is rigidly affixed to the coil 45 or may be affixed to the shell 46.

Flexible support bracket 26 is relatively wide in cross section so that the coil 45 is rigidly affixed with respect to the shaft 51 in an angular direction. However, changes of the coil dimensions along the axis of the shaft 51 cause the flexible support 26 to move in a direction generally designated by the arrow 57. This eliminates strain and distortion in the meter and thereby improves the meter accuracy.

In summary, this invention provides a moving coil instrument which has relatively stable balance and zero characteristics over wide temperature deviations by mounting one end of the coil fixedly to a shaft and the other end of the coil to a flexible support capable of deflection only along the longitudinal axis of the rotating shaft. While only one particular family of mechanisms, moving coil mechanisms, has been shown, it will be obvious to those skilled in the art that this invention may be adapted to other meter movements utilizing similar configurations under similar conditions.

What is claimed as new and desired to be secured by Letters Patent of the United States is:

1. In a moving coil electric instrument movement having shaft means rotatably supporting a coil, the improvement of means of fixing the coil to the shaft means comprising:
    (a) first bracket means rigidly connecting said shaft means directly to one portion of said coil; and
    (b) second bracket means connecting said coil to said shaft means spaced from said first bracket means and adapted to resiliently deform in a direction parallel to the axis of rotation of said shaft means but be rigid in a direction transverse to said axis.

2. A moving coil electric instrument as recited in claim 1 wherein said rotatable shaft means is constituted by a shaft having pivot portions at either end thereof adapted to be supported in jewel support means, said first and second brackets being mounted to said shaft near the pivots.

3. A moving coil electric instrument as recited in claim 1, the rotatable shaft means being constituted by a central shaft portion connected to and suspended by taut bands.

4. A moving coil electric meter movement as recited in claim 1 wherein said second bracket means comprises first, second and third portions, said first and said third portions being connected to said coil assembly and said shaft respectively, said first and said third portions lying in spaced, parallel planes, said second portion connecting said first and said third portions.

References Cited

UNITED STATES PATENTS

| | | |
|---|---|---|
| 1,916,162 | 6/1933 | Parker. |
| 2,925,558 | 2/1960 | Baermann _____ 324—150 |
| 3,010,067 | 11/1961 | Evans _____ 324—150 X |
| 3,155,906 | 11/1964 | Roper _____ 324—154 |
| 3,325,734 | 6/1967 | Peltola _____ 324—154 |

FOREIGN PATENTS

| | | |
|---|---|---|
| 1,114,189 | 4/1956 | France. |

ALFRED E. SMITH, Primary Examiner